(No Model.) 2 Sheets—Sheet 1.
G. H. DERBY.
LUMBER DRIER.
No. 334,940. Patented Jan. 26, 1886.
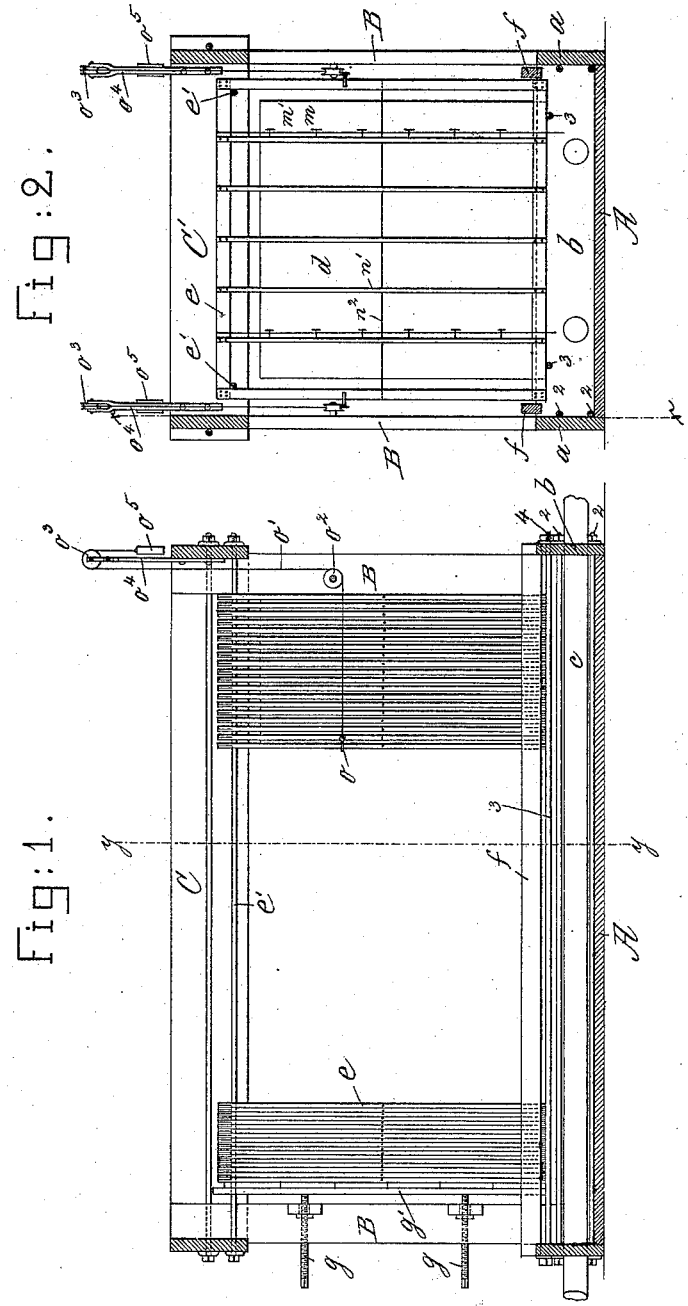
Witnesses.
Arthur Zipperlen.
John F. C. Prinkerh
Inventor.
George H. Derby
By Crosby & Gregory
Attys.

(No Model.) 2 Sheets—Sheet 2.
G. H. DERBY.
LUMBER DRIER.
No. 334,940. Patented Jan. 26, 1886.
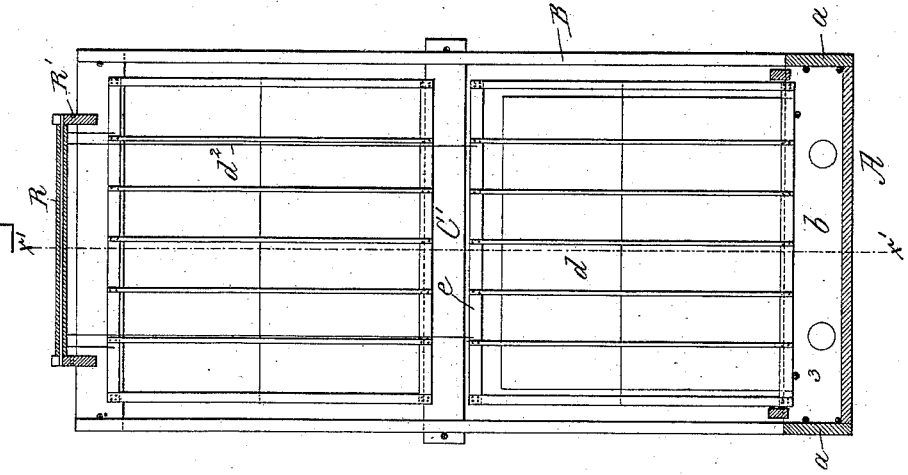
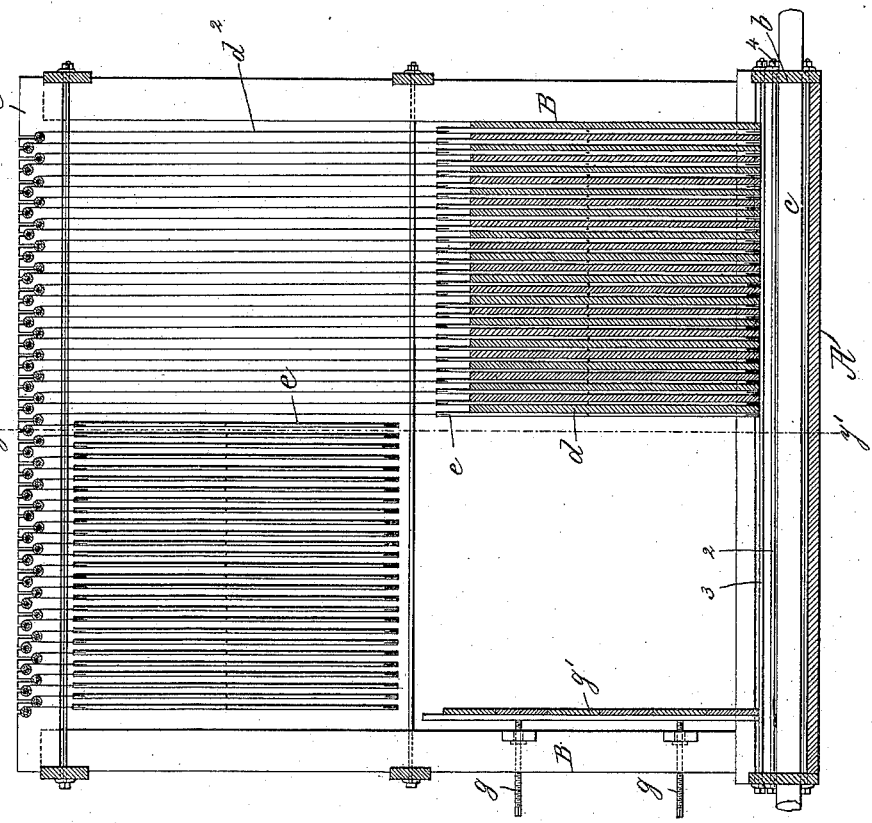
Witnesses. Inventor.
George H. Derby.
by Crosby & Gregory Attys

UNITED STATES PATENT OFFICE.

GEORGE H. DERBY, OF SOMERVILLE, MASSACHUSETTS.

LUMBER-DRIER.

SPECIFICATION forming part of Letters Patent No. 334,940, dated January 26, 1886.

Application filed August 7, 1885. Serial No. 173,867. (No model.)

*To all whom it may concern:*

Be it known that I, GEORGE H. DERBY, of Somerville, county of Middlesex, and State of Massachusetts, have invented an Improvement in Driers for Lumber and other Material, of which the following description, in connection with the accompanying drawings, is a specification, like letters on the drawings representing like parts.

This invention has for its object the production of an apparatus by which large veneers, boards, or lumber may be thoroughly, quickly, and evenly dried.

The invention consists in a frame or case, and a heating-chamber, combined with a series of independent separators, and means to guide them, whereby the separators may be quickly slid into position after the application to the frame or case of each layer of material to be drier lengthwise of the frame at the top portion thereof and parallel with the supporting-rods. Pipes for the circulation of steam or other heating medium or apparatus are placed in the base portion of the heating-chamber, the latter being open at its top to permit air heated in the chamber to circulate upward between the veneers or boards, which rest or stand vertically upon the supporting-rods, the separators being placed between the different layers of wood to be dried. The frame is provided at one end with screw-clamps, by which the contents of the frame may be brought in close contact, thereby straightening the lumber, and by keeping it in such position until dried warping is prevented.

Figure 1 in longitudinal section taken on the dotted line $x$ $x$, Fig. 2, represents a drier constructed in accordance with this invention; Fig. 2, a cross-section of Fig. 1, taken on the dotted line $y$ $y$; Fig. 3, a longitudinal section of a modified form of drier, taken on the dotted line $x'$ $x'$, Fig. 4; and Fig. 4 a cross-section of Fig. 3, taken on the dotted line $y'$ $y'$.

The base or floor boards A, side boards, $a$, and end boards, $b$, are suitably secured together to form a box or heating-chamber, through which suitable pipes, $c$, heated by steam or otherwise, are passed to heat the air in the said box or chamber, the heated air passing upward through the open top of the heating-chamber. Bolts 2 are passed longitudinally through the heating-chamber to add to the rigidity of the structure. The uprights B, secured to the base portion or heating-chamber, serve as corner-posts for the frame. The upper free ends of these posts are joined together by cross-beams C C C' C', the uprights and beams forming an open inclosing-frame to contain the wood to be dried and the separators. Two or more supporting-rods, 3, extend lengthwise of the heating-chamber, and are secured to the end boards, $b$, by suitable nuts, 4, and having their upper sides in a plane at or near or a little below the top of the base portion or heating-chamber, serving as the supports for the large veneers or boards $d$ which are to be dried, the said veneers or boards standing vertically and being admitted to the frame from the side. The veneers or boards $d$, resting upon the supporting-rods, are retained in vertical position and independent of each other by separators, consisting in this instance of reticulated frames $e$, shown as suspended from two rods or guides, $e'$, stretched lengthwise of the frame at the top and secured to the opposite end beams, C'. Guides $f$, extended lengthwise of the frame and connected with the end boards, $b$, so as to project somewhat above them, serve to keep the separators and veneers or boards from slipping or otherwise moving out of the frame sidewise.

In accordance with my invention the drying-frame is of such size and the separators are so suspended therein as to be capable of being moved all into one end or part of the frame, leaving an open space for the reception of the veneers or lumber to be dried, and a layer of veneer or lumber having been stood up vertically against the end of the frame which is first to be filled, and resting on the supporting-rods, a separator is slid or moved forward against and so as to retain the said veneer or lumber in vertical position, and then another layer of veneer, lumber, or other material to be dried is put in place vertically against the said separator, and another separator is slid or moved up against it, this being continued, layers of veneers, lumber, or other material to be dried being applied one after another, the separators being applied one after another and to alternate with the layers of material to be dried. The drying-frame having been sufficiently filled with alternate layers of veneers or lumber and separators, the platen $g'$, operated, as herein shown, by screws $g\ g$, is forced against the series of alternately-placed separators and veneers, compressing them closely together, preventing warping of the veneers or lumber while being dried by the air circulating upward between them.

By employing reticulated frames, as described, for separators and arranging the series of separators and veneers alternately, and by placing them vertically above the heating-chamber, the heated air in its normal tendency to rise comes in contact with both sides of the veneers drying them uniformly, the open top of the frame insuring a constant circulation of the heated air.

When it is desired to dry a large number of veneers at the same time, and to save time and expense in handling the same, a modified form of apparatus (shown in Figs. 3 and 4) may be employed. Referring to the said figures, it will be noticed that the frame is extended upward double the distance shown in Figs. 1 and 2, and the separators are suspended by cords $d^2$, passing over rollers R, mounted in bearings R' and controlled by suitable springs, such as commonly employed in connection with curtain-rollers or by weights. By this construction the separators are normally kept elevated in the top of the drying-frame, leaving sufficient space below for the entrance into the frame of a cart or wagon loaded with veneers, the latter being shoved off in layers, which are stood up singly or one at a time, and the separators are drawn down one at a time after the placing of each layer in position, the separators being held in their depressed positions either by usual pawls or ratchets of the rollers or by suitable latches. In this latter modification the separators are or may be constructed as in Figs. 1 and 2, and when placed between the veneers rest upon the supporting-rods.

It is obvious that the separators, instead of containing a frame, $n$, cross-bars $n'$, and joined by a wire or rod, $n^2$, may consist of any other suitable open or reticulated frame whereby heated air may pass upward and through the separators and be distributed throughout the drying-frame.

It is also obvious that instead of employing steam-circulation pipes for heating the chamber, any other suitable apparatus may be employed with beneficial results without departing from my invention—such, for, instance, as hot air forced therein and equally distributed.

When it is desired to dry narrow strips of thin veneer or other material, the same may be conveniently tied to the reticulated frames by a cord, $m$, suspended from the top of the frame $e$, and as each veneer is placed against the frame $e$ the cord is carried beneath it and wound upon the tack or peg $m'$ driven into the cross-bars $n'$. As the successive alternate layers are placed in vertical position they may be more surely retained by hooks $o$, to engage the last frame or veneer as it is stood up, said hook being held fast by cords $o'$ passing over sheaves $o^2$, secured to the uprights B, and over sheaves $o^3$, mounted in uprights $o^4$, secured to and extended above the cross-beam C', said cords being held taut by weights $o^5$. As shown, one hook is employed at each side of the frame, but two or more may be employed, as deemed necessary.

I do not claim a lumber-rack consisting of a frame and vertical sticks held movably between the bars of the said frame, each stick on each side having to be separately moved to receive a plank between four adjacent sticks, and the rack filled with planks placed in the air or a kiln to dry the lumber.

I claim—

1. A drier comprising the base A, sides $a$, ends $b$, and heating-pipes $c$, constituting a heating-chamber, the drying-frame erected thereon, the supports 3 3 in the top of the heating-chamber, and the quadrangular separating-frames $e$, resting upon said supports, substantially as described.

2. In a drier, the base A, sides $a$, ends $b$, and heating-pipes $c$, constituting a heating-chamber, the drying-frame superposed thereon, the supports 3 3 in the heating-chamber, the supporting-rods $e'\ e'$, and the quadrangular separating-frames $e\ e$, suspended from and movable upon the rods and sustained by the supports, substantially as described.

3. In a lumber-drier, the heating-chamber consisting of the base-board A, side and end boards, $a\ b$, and steam-pipe $c$ passing therethrough, and frame attached to said chamber, combined with the supporting-rods 3, wire $e'$, and reticulated separators suspended loosely upon said wire, all as set forth, and for the purpose described.

4. In a drier, the drying-frame, the heating-chamber, and supports for the veneers or lumber, combined with separators suspended within the frame and adapted to be slid or moved freely into position one after another against the veneers or boards to be held in place by them and to be dried, and hooks to engage the said separators or veneers to retain the same while the next separator or veneer is being placed in position, substantially as described.

5. In a drier, the drying-frame, the heating-chamber, and supports for the veneers or lumber, combined with separators suspended within the frame and adapted to be slid or moved freely into position one after another, and means, substantially as described, for separately securing a series of narrow boards to the separator, all substantially as and for the purposes described.

In testimony whereof I have signed my name to this specification in the presence of two subscribing witnesses.

GEORGE H. DERBY.

Witnesses:
F. CUTTER,
B. J. NOYES.